Motor 5

Motor 34

Electro-magnet 9

Motor 30

Motor 7

Electro-magnet 3

Motor 1

Motor 12

FIG.7

United States Patent Office 3,361,654
Patented Jan. 2, 1968

3,361,654
METHOD FOR AUTOMATIC REGULATION OF THE DISTANCE BETWEEN ELECTRODES IN ELECTROLYTIC CELLS FOR A MOBILE CATHODE
Charles Deprez, 20 Ave. de Sumatia, Uccle-Brussels, Belgium, and Rene Bulte, deceased, late of Forest-Brussels, Belgium, by Freddy Bulte, rightful heir, 18 Ave. des Criquets, Brussels, Belgium, and Rene Crabbe, 8 Ave. des Dryades, Boitsfort-Brussels, Belgium
Filed Oct. 19, 1966, Ser. No. 588,672
Claims priority, application Belgium, Feb. 9, 1957, 554,895
7 Claims. (Cl. 204—99)

ABSTRACT OF THE DISCLOSURE

The operating of an electrolytic cell for the decomposing of a substance decomposable by an electric current, which cell has a fluid cathode and a movable anode, is improved by a highly accurate and precise method of optimizing the spacing between the anode and the cathode without interrupting the electrolysis. The anode is advanced toward the cathode while the electrolytic current of the cell is detected. The advancing of the anode is continued until there is detected a rapid increase in the rate at which the current is increasing not attributable to an increase in the rate of advancing, and at this point the advancing of the anode is terminated and the anode is displaced in the opposite direction to a distance spaced from the cathode corresponding to the optimum yield of the cell.

---

This is a continuation-in-part of our copending application Ser. No. 585,699 filed Oct. 10, 1966 and now abandoned, which is a continuation of our application Ser. No. 182,514 filed Mar. 26, 1962 and now abandoned, which is a division of our application Ser. No. 713,940 filed Feb. 7, 1958, now Patent 3,052,618.

In horizontal cells, for the electrolysis of aqueous solutions and of the type having a moving mercury cathode, it is necessary to regulate periodically the distance between the electrodes, in order to compensate for the wear of the graphite anodes.

Various devices have already been proposed enabling this regulation to be effected without interrupting the operation of the cell. W. C. Gardiner, for example, describes in "Chemical Engineering," volume 54 of November 1947, pages 108 to 112, supporting rods for the lead-in of the current to the anode plates which are arranged in the lid of the electrolytic cell in such manner that the rotation of the rods causes the anode plates to descend towards the moving cathode. The first regulation is effected in the state of rest when the anodes are renewed, and during operation the wear of the anodes is periodically compensated for by the rotation of the supporting rods which causes the anodes to descend a distance controlled by the voltage, read from a voltmeter, existing between the anodes and the moving cathode.

It has also been proposed in Belgian Patent No. 451,762 to regulate the distance between the anodes and the moving mercury cathode during the operation of the cell by displacing the plates supporting the anodes and serving as a lid for the electrolytic cell. For this purpose, the lateral sides of the cells are fitted with fixed supports with which threaded rods engage, these rods being fixed to the plates, which are thus suspended from the fixed supports and maintained in position by nuts screwed on the threaded rods and tightened on the fixed supports. By loosening the nuts, the plates are caused to descend, thus enabling the wear of the anodes to be compensated for during operation.

In these two systems, the regulation depends on the estimation of the operator and is thus not safeguarded against errors. For this reason there have been proposed devices comprising, on the bottom of the cell which constitutes the support for the moving mercury cathode, supports on which the freely-suspended graphite anodes rest. When and as the graphite disappears, the anodes descend towards the cathode and the distance between the electrode is thus theoretically kept constant and determined by the dimensions of the supports. These devices have two disadvantages. On the one hand, the supports constitute a permanent obstacle to the uniform circulation of the mercury and may constitute barriers opposing the carrying away by the mercury of impurities or solid residues, which may form permanent local short-circuits detrimental to the good operating of the cell. On the other hand, the wear is less rapid at the point of contact between the supports and the anode than elsewhere and the distance between the electrodes is difficult to estimate. To obviate these disadvantages it has been proposed in Belgian Patent No. 522,772 and U.S. Patent No. 2,784,-157, to provide cavities in the support of the moving mercury cathode wherein retractable calipers may move which emerge from the support surface to a predetermined height and on which the anodes may rest during the regulation.

Heretofore, all processes and all devices for carrying out such processes of regulation have been based upon manual operation.

The present invention relates to a method for regulating, during operation, the distance between the electrodes of electrolytic cells having a moving mercury cathode which permits all of the anodes to be regulated within a minimum of time, thus obtaining a precise regulation independent of any human factor of estimation.

We have found the surprising fact that it is possible, without major disadvantages, to tolerate for a limited time an incipient contact between an anode and the moving mercury cathode of an electrolytic cell. The process accordingly consists in a new and improved method of cell operation and a method of electrode adjustment consisting in successively gripping each anode by its support rod and current lead which projects through the lid of the cell, causing it to approach the cathode, until the amperage attains a given value as a function of the voltage existing in the cell or undergoes a rapid increase, and in subsequently displacing the anode in the opposite direction for a distance substantially corresponding to the optimum yield of the electrolytic cell.

A device which can be used for automatically carrying out the process according to the invention will be described below and suitably comprises a combination of two carriages, the first of which runs on a runway parallel to the longitudinal axis of the cell, the second running at right angles to the first. The second carriage is fitted with pincers having several catches arranged concentrically to the support of the anode to be displaced which is movable in a vertical direction, the movements of the carriage and of the pincers being electrically controlled according to a pre-established plan from a control station situated at any point of the electrolytic plant, or at one end of the two carriages.

It is to be understood that the invention is in no way limited to the examples given in the drawing.

The device illustrated is fitted with a series of relays and contactors ensuring its automatic operation. It is known that a contactor may simultaneously ensure the opening and the closing of different circuits, thus permitting several simultaneous possibilities. In order to indicate these circuits and thus the various possibilities, there are used in FIGURES 3 and 4 of the accompanying drawings numbers which are placed in brackets after the reference number of the contactor in question. Moreover, some contactors are open in the state of rest, while others are closed. In order to indicate this difference, the symbols $o$ and $c$ are used to indicate "open" and "closed," respectively. Thus, the contactor 111(1)$c$ denotes that the contactor 111, circuit 1, is closed in the position of rest, that is to say open when it is mechanically actuated, whereas the contactor 111(2)$o$ denotes the contactor 111, circuit 2, is open in the position of rest, that is to say closed when it is mechanically actuated. Thus, when the contactor 111 is actuated, the circuit 1 is interrupted whereas the circuit 2 is closed.

Figures 1, 1A:
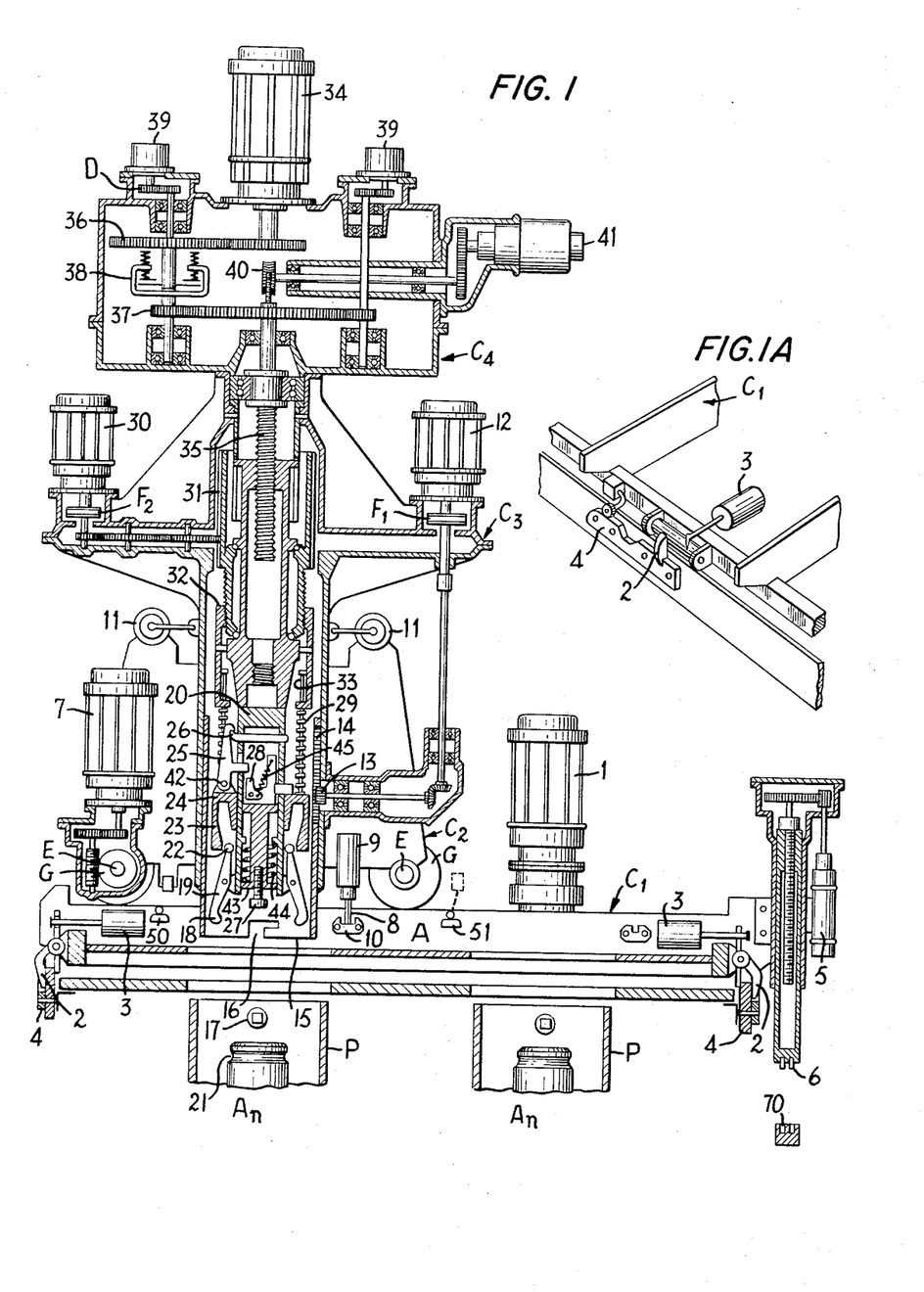
FIG. 1 of the accompanying drawings illustrates a device for carrying out the process according to the invention.
FIG. 1a is a similar view of the device seen in FIG. 1 but showing only the lower half of FIG. 1 and illustrating the cells and anodes with which the device can be associated.

The device shown in FIG. 1 comprises in outline a large carriage $C_1$ allowing the longitudinal displacement of the device, a small carriage R moving transversely and carrying the pincers, the system for fastening the pincers to the tubular piece P fixed on the lid of the electrolytic cell and the system for opening and closing the pincers on the rod supporting the anode. Finally, the assembly of the device is fitted with various control and regulation systems.

Figure 6:
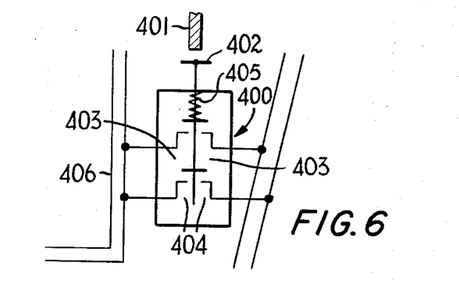
FIG. 6 shows a modification of the contact plug in the form of a contactor.

The large carriage is composed of a chassis $C_1$ supported by two axles (not shown) on which two rollers (not shown) are arranged. One axle is driven by the motor 1 fitted with a speed reducer. The starting of the motor 1 is controlled by means of the contactor 101$o$. The lateral traverses of the chassis comprise fingers 2 actuated by electromagnets 3. These fingers fix the carriage in a predetermined position by engaging with stopping notches 4. The fingers 2 are raised by the feeding of the electromagnets 3 which is determined by means of the contactors 102(2)$o$, 103(1)$o$, 104(1)$o$, 105(2)$c$, 106(3)$o$, 107(1)$c$, 107(2)$c$, the relays 201 and 220(2), the latter being timed to one second delay, viz. ensuring contact for one second after removal of actuating voltage. One of the traverses carries shoes 50 and 51 whose purpose will be explained below. On the other hand, the motor 5 is fixed on one of the traverses, fitted with a speed reducer and actuating the double contact plug 6 which engages with the double current supply 70, each of whose sockets is connected at a different point with the current path, that is to say connected with a different point of the copper bar CU serving for the circulation of the current from the sole of the electrolytic cell to the anodes of the immediately adjacent cell. This contact plug verifies the amperage existing in the cell when the anode A$n$ contacts the liquid cathode Hg, above which is found the electrolyte S$a$ and below which is the sole S$o$ of the cell, in conventional manner. These conventional elements are not shown. The contact plug 6 is subject to corrosion. A contactor is therefore preferably used as shown in FIG. 6. This contactor is completely enclosed in a sealed casing 400; instead of the contact plug 6, the axle controlled by the motor 5 is fitted with a finger 401 which engages the movable piece 402 of the contactor. This movable piece, when descending, ensures the closing of the circuits 403 and 404 conected with different points of the copper bar 406 which ensures the circulation of the current from the sole S$o$ of the electrolytic cell CLL II to the anodes A$n$ of the adjacent cell CLL II. The movable piece 402 is fitted with a return spring 405. The motor 5 is actuated by means of the contactors 106(4)$o$, 108(1)$o$, 108(2)$o$, 109(4)$o$ (timed to one second), 110(2) $o$, 110(3)$o$, 110(4)$c$, the relays 202, 203, 204, 205 (timed to one second) and the push button 301(1)$o$ (timed to one second).

The small carriage R also comprises two axles E fitted with rollers G. One of these axles is driven by the motor 7 fitted with a speed reducer and actuated by means of the contactors 106(2)$o$, 111(2)$o$, 116(1)$o$, 116(2)$c$, 116(3)$c$ and the relays 206 and 218. The device for fastening the small carriage to the large carriage comprises the finger 8 actuated by the electromagnet 9 and permits the immobilization of the small carriage due to the stopping notches 10 provided on the transverse side members A. Voltage is applied to and cut off from the electromagnet 9 by means of the contactors 102(2)$o$, 103(1)$o$, 105(1)$c$, 106(1)$c$, 106(5)$o$, 111(1)$c$, 117$c$, the relays 207, 208, 220(1) (timed to one second), and the push button 301(2)$o$. The small carriage is fitted with a chassis $C_2$ comprising four elastic supports 11 to which the pincers and the various systems of regulation and control are fastened. The assembly supported by the elastic supports 11 is thus rendered independent of the carriages during the control operations.

The pincers consist of several parts which may be operated simultaneously or separately by any automatic or nonautomatic electric device. This entire assembly is enclosed in the casings $C_3$ and $C_4$ which are tight and resistant to corrosive liquids.

Figure 2:
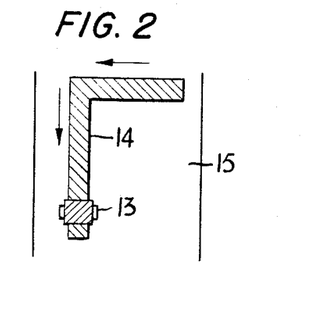
FIG. 2 shows a detail of the means for fastening the device to the lid of the electrolytic cell.

The system of fastening the device to the tubular piece P surrounding the supporting rod of the anode and fastened to the lid of the electrolytic cell comprises the motor 12 fitted with a speed reducer and a frictional coupling $F_1$. The motor 12 is actuated by means of the contactors 103(2)$o$, 103(3)$o$, 109(1)$o$ (timed to one second), 110(1)$o$, 112(1)$c$, 112(2)$c$, 113(2)$o$, 113(3)$c$ and the relays 209, 210(2) (timed to one second), 211 and 212. The motor 12 actuates by means of a pinion 13, having teeth inclined at 45°, and a rack 14 having the form of a bracket, the fastening tube 15 fitted with bayonet notches 16 fastening it to the projection 17 of the tubular piece P which is fastened on the lid of the electrolytic cell around the rod supporting the anode A$n$. FIG. 2 is a fragmentary view of the rack 14. It is made of two branches arranged at right angles. The pinion 13 to which a guide roller is fixed (not shown) engages in the first instance the rack arranged on the vertical branch which results in the descent of the fastening tube 15. At the end of its course, the pinion 13 engages the rack disposed on the horizontal branch thus causing the fastening tube to turn and securing it, by means of the bayonet notches 16, to the projection of the tubular piece P. It should be noted that the rod supporting the anode should be arranged in the lid of the electrolytic cell in such manner that the cell will be perfectly tight. To this effect, a suitable device will be used such as has been described, for example, in Belgian Patent No. 457,712.

The pincers proper comprise the catches 18 joined to the integral axles 19 of the support 20. The lower end of each catch is intended to engage the groove 21 cut into the rod supporting the anode A$n$. The upper part of each catch is fitted with a head 22 engaged by the female cone 23 and the male cone 24. When the catches are open, the cones 23 and 24 are hooked to a projection 26 by means of a small hooked rod 25. The small rod 25 is fitted with a spring (not shown) which tends to hold it fast to the support 20 and is movable around the axle 42. A notch is provided in the support 20 for passing the hook of the small rod 25. When the catches are closed, the push button carried by the piece 43 which is capable of sliding in the support 20 and fitted with a return spring 44, is in contact with the rod supporting the anode. The piece 43 carries a lever 28 arranged in a groove of the support 20 and fitted with a spring 45 which tends to keep it against the wall of the support 20. This lever is displaced upwards as soon as the push button is put in contact with the rod supporting the anode and it engages the heel of the small rod 25 which is then freed from the projection 26. The cone 24 engages the springs 29, the relaxation of which causes the cones 23 and 24 to descend thus causing the catches to be closed.

The operating mechanism of the pincers comprises the motor 34 controlled by means of the contactors 102(2)$o$, 109(5)$o$ (timed to one second), 110(1)$o$, 115(1)$o$, the relays 210(1) (timed to one second), 216, 217 and 219. The motor 34 ensures the descent and the ascent of the pincers by means of trains of reduction gears 36 and 37, the friction coupling 38 and the endless screw 35 at which the support 20 is suspended. The verification of the rising distance of the pincers is effected by the "synchro" circuit interrupter 41 having a controllable course which is set in motion by means of an endless screw 40 which engages the endless screw 35. The controllable interrupter "synchro" 41 completes one rotation of 360° for a vertical movement of the pincers of 100 millimeters. A safety device reversing the rotation of the motor 34 is provided by the two generator dynamos 39 actuated by means of the gear trains 36 and 37 and by the gear wheels D.

The restitution mechanism of the cones 23 and 24 comprises the motor 30 fitted with a friction coupling $F_2$ which actuates a tubular gear wheel 31 the lower end of which is threaded and fitted with a nut 32, with which the rods 33 engage, to raise the cones 23 and 24. The motor 30 is actuated by means of the contactors 109(2)$o$, 109(3)$o$ (both timed to one second), 114(1)$o$, 114(2)$o$, the relays 213, 214, 215 and the controllable interrupter "synchro" 41.

It should be mentioned that all the motors are fitted with a mechanical brake whose jaws are actuated by an electromagnet arranged in series or in parallel with the motor. Stopping of the supply of current to the motor gives rise to the stoppage of the supply of current to the electromagnet which determines the braking of the movement of the motor by locking its axle by the jaws of the brake. As a matter of course, the motors, contactors and relays are protected from shock and covered by a jacket which is resistant to corrosive fluids.

The various contactors are actuated by the following pieces:

Large carriage $C_1$: 105(1)$c$ and (2)$c$; 107(1)$c$ and (2)$c$;

Small carriage R: 106(1)$c$, (2)$o$, (3)$o$, (4)$o$, (5)$o$, 111(1)$c$ and (2)$o$, 117$c$;

Finger 2: 101$o$; 110(1)$o$, (2)$o$, (3)$o$ and (4)$c$;

Finger 8: 113(1)$o$, (2)$o$ and (3)$c$; 116(1)$o$, (2)$c$ and (3)$c$;

Contact plug 6: 104(1)$o$, (2)$o$ and (3)$o$; 108(1)$o$ and (2)$o$;

Fastening tube 15: 103(1)$o$, (2)$o$ and (3)$o$; 112(1)$o$ and (2)$o$;

The end 18 of the catches actuates a contactor (not shown) which has the effect of diminishing the speed of rotation of the motor 34 which rotates fairly slowly when the catches are closed over the rod supporting the anode;

The nut 32: the contactor, timed to one second, 109(1)$o$, (2)$o$, (3)$o$, (4)$o$ and (5)$o$ and the contactor 114(1)$o$ and (2)$o$;

All of the pincers: 102(1)$o$ and (2)$o$;

The contactor 115(1)$o$ and (2)$o$ is actuated by mechanisms described below.

Figure 3:
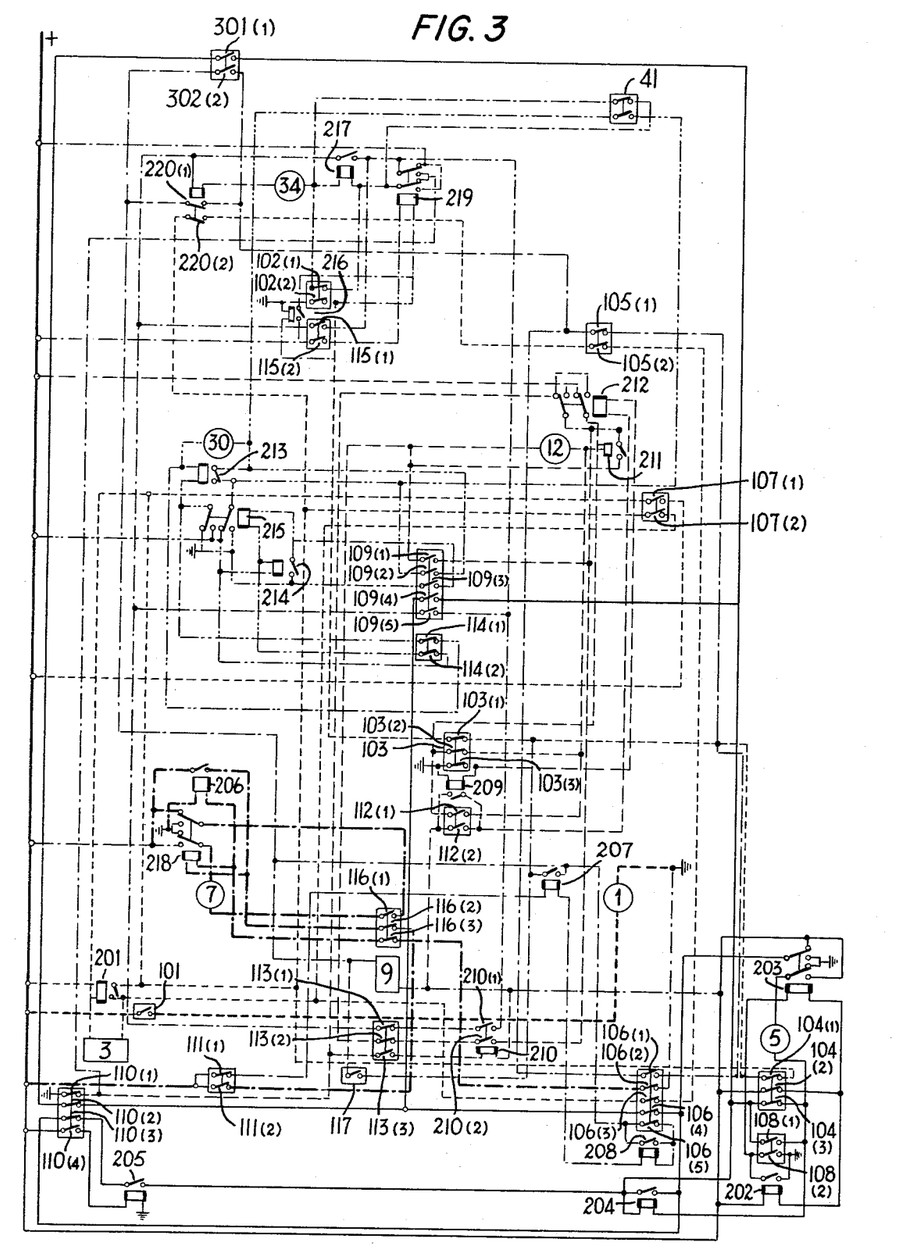
FIG. 3 diagrammatically illustrates the various connections existing between the various members ensuring the automatic operation of the device.
Figure 4:
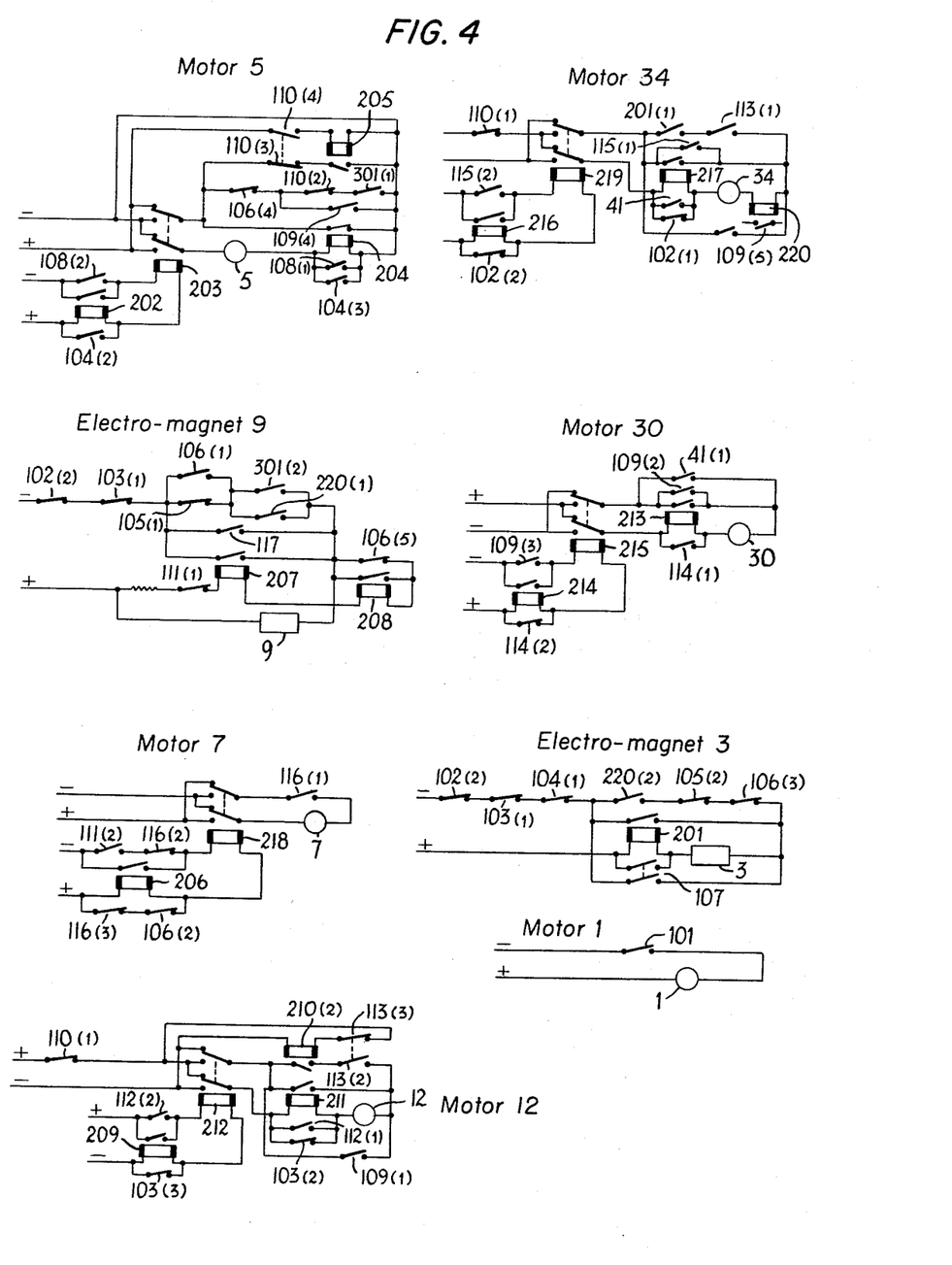
FIG. 4 diagrammatically illustrates the supply circuits of all the operating members of the device.
Figure 5:
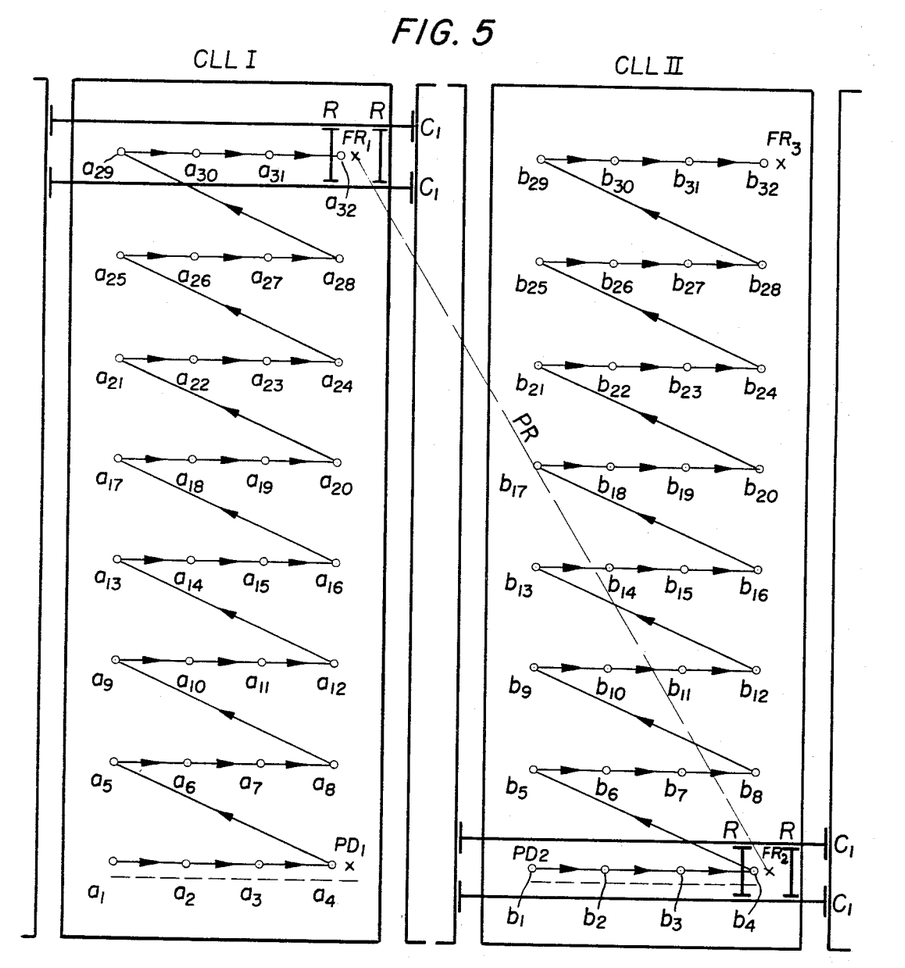
FIG. 5 diagrammatically illustrates an electrolytic plant in plan view, the arrows indicating the direction in which the regulation is effected.

FIG. 5 shows a diagrammatic plan view of an electrolytic plant. According to this diagram, the device has just effected the control of the cell CLL 1 and is in the position of "end of control" indicated by $FR_1$, that is to say the small carriage R has started from a starting point $PD_1$ and has consecutively stopped level with the anodes $a_1$, $a_2$, $a_3$, $a_4$ . . . $a_{32}$, and has then moved up to the point "end of control" $FR_1$. The device is then displaced according to the dotted arrow PR by a rolling bridge and is now situated in the axis of the first series of anodes $b_1$, $b_2$, $b_3$ and $b_4$ of the cell. The large carriage is connected to an alternative current source of 110–115 volts and fastened by means of the fingers 2 which engage with the notches 4 shown in FIG. 1. FIG. 3 summarizes the position of all of the contactors at this instant. The pincers are in the upper position and actuate the contactor 102$o$ (both circuits being closed). The contactor 115$o$ is not actuated (both circuits being open). The large carriage being bolted, the fingers 2 are in the notches 4 and no longer acuate 101$o$ (open circuit), but actuate the contactor 110 (circuits (1), (2) and (3) closed—circuit (4) open). In the locked position the large carriage cannot actuate the contactor 105—(both circuits closed). On the other hand, it actuates the contactor 107$c$ (both circuits open). The nut 32 is in the low position on the threaded part of the tubular gear wheel 31 and actuates the contactor 114$o$ (both circuits closed), whereas the contactor 109$o$ is free (the five circuits being open). The fastening tube 15 in the high position actuates the contactor 103$o$ (the three circuits being closed). The finger 8 which has fallen back actuates the contactors 113 (circiuts (1) and (2) closed, circuit (3) open) and 116 (circuit (1) open, circuits (2) and (3) closed). The small carriage in the position $FR_2$ actuates the contactor 106 (circuit (1) open, circuits (2), (3), (4) and (5) closed), does not actuate 111 (circuit (1) close and circuit (2) open) and actuates the contactor 117—(circuit open). The contact plug 6 being in the high position, the contactor 104$o$ is actuated (the three circuits being closed), while the contactor 108$o$ is in the position of rest (both circuits open).

The small carriage R being in $FR_2$, the push button 301 of the control post is pressed thus starting the following series of operations:

(1) The small carriage moves towards the other end of the large carriage $C_1$ while the contact plug 6 descends and plug itself into the current supply 70. These operations analyze as follows:

(a) Motor 5: By the closing of 301(1), timed to one second, the motor 5 is put under voltage and rotates in the direction corresponding to the descent of the contact plug 6 thus causing the opening of the contactor 104$o$; the circuits (2) and (3) of this contactor being open, voltage is applied to the relay 204 thus enabling the motor 5 to be continuously supplied when 301(1) is re-opened. When the contact plug arrives at the end of the course, it actuates the contactor 108$o$ which closes; the closing of the circuit (1) of this contactor leads to the end of the supply of the motor 5, since the relay 204 is disconnected, whereas the closing of the circuit (2) causes the application of voltage to the relays 202 and 203, the latter preparing the re-ascending movement of the contact plug 6 by reversing the direction of rotation of the motor 5.

(b) Electromagnet 9 and motor 7: The closing of the push-button 301(2) timed to one second, determined the application of voltage to the electromagnet 9 and the relays 207 and 208. The finger 8 is lifted and actuates the contactor 116 whose circuit (1) closes, while the circuits (2) and (3) open: the motor 7 is placed under tension, the small carriage R moves and thereby no longer actuates the contactor 117$c$ which closes; the electromagnet 9 remains under voltage when 301(2) is re-opened on account of the fact that 207 remains under voltage. Due to its displacement, the small carriage no longer actuates the contactor 106 (circuit (1) closed, circuits (2), (3), (4) and (5) open). After a certain course of the small carriage, the shoe 50 fixed at the end of the transverse side member A raises the contactor 111 (circuit (1) open and circuit (2) closed). In parallel with the contactor 111 the contactor 117 is actuated and opens. The electromagnet 9 is thus no longer fed, the finger 8 falls back and ceases to actuate 116. The circuit (1) is thus open, the motor 7 is no longer fed, whereas the circuit (2) and (3) of the contactor 116 are closed, (applying the voltage to the relays 206 and 218), the latter preparing the reversal of the direction of rotation of the motor 7. The small carriage continues its course and the finger 8 is blocked in the notch 10 whereby the contactor 113 (circuits (1) and (2) closed and circuit (3) open) is actuated.

(2) The action on the contactor 113 gives rise to the application of voltage to the motors 12 and 34 which respectively ensure the fastening of the device to the cell and the descent of the pincers.

(a) Motor 12: Before the finger 8 actuates the contactor 113, the circuit (3) of the contactor is closed and the relay 210 is under tension. This relay is timed to one second, the action on the contactor 113 (closing of the circuits (2) and (3)) causes the application of voltage to the motor 12. The fastening tube 15 descends and frees the contactor 103o (the three circuits being open). Due to the opening of the circuit (1) of this contactor, no voltage can be applied to the electromagnets 3 and 9, whereas the opening of the circuits (2) and (3) determines the application of voltage to the relay 211 thus enabling the motor 12 to be continuously fed when the relay 210(2) is re-opened. It should be kept in mind at this point that the pincers and the casings $C_3$ and $C_4$ are independent of the small carriage R on account of the elastic supports 11 thus permitting freeing movements of the pincers and the casings. Due to the rack 14 having the shape of a cross-piece, the projections of the tubular pincers P engage with the bayonet notches 16 when the tube 15 descends, then by rotation of the tube 15 (horizontal branch Y of the rack 14) the whole is fastened to the tubular piece P. At this instant the tube 15 actuates the contactor 112o. The closing of the circuit (1) of this contactor interrupts the supply of the relay 211 and thus that of the motor 12. The closing of the circuit (2) of the same contactor causes the application of voltage to the relays 209 and 212, the latter preparing the re-ascent of the tube by reversing the direction of rotation of the motor 12.

(b) Motor 34: 210(1) being timed to one second, the closing of the contactor 113 (circuit (1)) determines the application of voltage to the motor 34 and to the relay 220. The pincers start their rapid descent, the rotation of the screw 35 causing the support 20 to descend, and thus the contactor 112o is freed which results in the application of voltage to the relay 217 thus ensuring the continuous supply of the motor 34 when the relay 210(1) is re-opened. Since the pincers continue to descend, the push button 27 comes in contact with the rod supporting the anode; the piece 43 has from now on an ascending movement with regard to the support 20 thus displacing the lever 28 upwards. The lever 28, by leaning on the hook of the small rod 25, lifts it and frees it from the projection 26. The cones 23 and 24 are then immediately driven out by the relaxation of the springs 29; the cone 24 separates the heads 22 and the catches 18 close over the groove 21 cut in the supporting rod of the anode. The descending movement of the cones 23 and 24 and the closing movement of the catches causes the closing of a contactor (not shown) and this has the effect of reducing the rotation speed of the motor 34 from 3000 r.p.m. to 1000 r.p.m., the anode thus slowly descending towards the moving cathode. On account of the drawback spring of the small rod 25 and of the lever 28, the heel of the small rod now strikes the lateral part of the lever 28.

(3) The anode to be controlled approaches the moving mercury cathode, and the re-ascending movement of the pincers, in order to carry out the process according to the invention, is effected by reversing the direction of rotation of the motor 34. The reversal of the direction of rotation of the motor 34 is carried out by closing the contactor 115o which is actuated indifferently by one of the three following mechanisms.

If the amperage verified by the contact plug 6 reaches a given value as a function of the voltage existing in the cell;

If this amperage undergoes a rapid increase;

If the friction coupling 38 slips. The latter system is a safety device. If for any reason the two preceding mechanisms have not worked, the pincers continue to descend and the anode rests on the sole of the cell which represents a certain mechanical effort. The friction coupling 38 is set in such a manner as to slide, beyond a certain tolerated effort. Below this tolerated effort it does not slide and the two generating dynamos 39 which rotate at the same speed as the motor 34 supply the same amount of current, and the difference of potential between the two generators arranged opposite one another is nil. Beyond the tolerated effort, the coupling slides and the two generators no longer rotate at the same speed; there is thus a difference of potential taken up by a relay (not shown) which actuates the contactor 115o. The closing of this contactor by any of the three mechanisms leads to the application of voltage to the relays 216 and 219, the latter causing the reversal of the direction of rotation of the motor 34 and thus the re-ascent of the pincers.

(4) The reversal of the direction of rotation of the motor 34 causes the opening of the contactor 115o, but since the relays 216 and 219 remain under voltage, the direction of rotation of the motor 34 corresponding to the ascent of the pincers is maintained. Similarly, the relays 217 still under voltage permit the continuous supply of the motor 34. The reversal of the direction of rotation of the motor 34 determines moreover the extent of the displacement of the re-ascent of the pincers and thus of the anode, by the controllable interruptor 41 which operates by means of the endless screw 40 only during the ascending movement of the pincers. After a controllable distance of ascent comprised between 0 and 30 millimeters, the controllable interruptor "synchro" 41 closes, the relay 217 is no longer supplied and, thus, the motor 34 is no longer supplied and stops.

(5) The stopping of the motor 34 (closing 41(1)) causes the application of voltage to the motor 30 which actuates the tubular gear wheel 31. The nut 32 arranged in the low position on the threaded part of the tubular gear wheel, ascends and lifts the cones 23 and 24 by means of the rods 33 whose heads are fitted with an enlargement having the purpose of rigidly fixing them to the nut 32 from a predetermined position. The small rod 25 hooks to the projection 26 and the catches 18 of the pincers spread open: this has the effect of freeing the contactor which determines the slow speed of the motor 34. As the nut 32 rises to the high position on the threaded part of the tubular gear wheel, it frees the contactor 114 which results in the application of voltage to the relay 213 thus permitting a continuous supply to the motor 30. The nut 32, now arriving at the high position, actuates the contactor 109o timed to one second, that is to say the five circuits close during one second. The closing of the contactor 109o has the effect:

(a) Of "rearming" the mechanism for the closing of the catches 18. Actually, the circuit (3) being closed, the relays 214 and 215, the latter of which causes the reversal of the direction of rotation of the motor 30, are under voltage. The controllable interruptor "synchro" 41 is re-opened and the nut 32 re-descends to the low position on the tubular gear wheel thus compressing the springs 29 between the cone 24 and the nut 32. At the same time, the contactor 109o is freed, the motor 30 still being supplied because the relays 213 are under voltage, and it rotates in the direction corresponding to the descent of the nut 32, the relays 214 and 215 being under voltage. Having arrived at the low position, the nut 32 actuates the contactor 114o thus closing the circuits (1) and (2). The relays 213, 214 and 215 are no longer under voltage, the supply of the motor 30 is interrupted and, at the same time the direction of rotation is reversed, since 215 is no longer under voltage.

(b) The closing of 109(1) causes the application of voltage to the motor 12. The fastening tube 15 rotates, is freed from the projections 17 and the tubular piece P and re-ascends. As a result, the contactor 112o is freed, the continuous supply of the motor 12 being ensured on account of the fact that voltage is applied to the relay 211, since 109(1) is re-opened within a second. Having arrived at the high position, the tube 15 actuates the contactor 103o, the three circuits are closed causing the supply of the relay 211 to be terminated and thus the stopping of the motor 12 and at the same time the reversal of the direction of its rotation with a view to subsequent operation, the relays 209 and 212 being no longer under voltage.

(c) The closing of 109(5) causes the application of voltage to the motor 34: the pincers re-ascend, the controllable interruptor "synchro" 41 is opened. Having arrived at the high position, the pincers actuate the contactor 102o, thus excluding the relays 216, 217 and 219 from the circuit. The motor 34 is no longer supplied and the reversal of the direction of rotation is prepared (219 out of circuit).

(6) Thus, there is again achieved the initial situation 1–b. It should be mentioned here that when the motor 34 is under voltage, the relay 220 is under voltage. Now, this relay is timed to one second and when the closing of the contactor 102 causes the stopping of the motor 34, 220 remains closed for another second and this determines the application of voltage to the electromagnet 9, the finger 8 which is lifted acts on the contactor 116 whose circuit (1)o closes, the motor 7 is placed under voltage and the small carriage moves towards the following anode and no longer acts on the contactors 111 (circuit (1) closed, circuit (2) open) and 117c (closed) thus permitting the supply of the electromagnet 9 when the relay 220(1) opens. After a certain course of the small carriage, a shoe 51 situated on one of the side member lifts 117c which opens at the same time as 111(1). The electromagnet 9 is no longer supplied, the finger 8 falls back and no longer actuates 116, the circuit (1) of this contactor opens, the motor 7 is interrupted while the direction of rotation remains the same because the relays 206 and 218 are still under voltage. The small carriage continues on its course, until the finger 8 engages with one of the stopping notches 10 thus actuating the contactor 113 which controls the motors 12 and 34, and the operation starts again as under 2.

(7) After the control of the last anode of the series (for example $b_4$), the small carriage actuates the contactor 106 (circuit (1) open, circuits (2), (3), (4) and (5) closed). The nut 32 being in the high position (raised by the cones 23 and 24), 109o is closed. Simultaneously with the re-ascent of the pincers after the control of the last anode of the series and with the re-ascent of the fastening tube, the closing of the circuit (4) of the contactor 106 and of the circuit (4) of the contactor 109 (timed to one second), places the motor 5 under voltage: the contact plug 6 re-ascends, freeing the contactor 108o, the relays 202 and 203 which are under voltage enable the motor 5 to rotate in the direction corresponding to the ascent of the contact plug 6; the relay 204 is placed under voltage and thus allows the continuous supply of the motor 5 once the contactor 109(4) is re-opened. Having arrived at the high position, the contact plug 6 actuates the contactor 104o. The circuits (2) and (3) being closed, the relays 202, 203 and 204 are no longer supplied and the motor 5 stops while the reversal of the direction of rotation is prepared (203 out of circuit).

(8) As soon as the contact plug 6 has re-ascended, the re-ascending movement of the pincers, which is the longest movement, is terminated, and the pincers in the high position actuate the contactor 102o. The relay 220 which remains closed for one second after the termination of the supply of the motor 34, applies voltage to the electromagnets 3 and 9 and, as a result, the motors 1 and 7 are fed. The small carriage R returns to its starting position while the large carriage moves towards the following series of anodes ($b_5$ . . . $b_8$) where it stops, locks itself and the contact plug 6 descends to the current supply 70. These operations analyze as follows:

(a) Electromagnet 3: the relay 220(2) being closed, the closing of the contactor 102(2) permits the supply of the electromagnet 3, since the contactor 106 is still actuated by the small carriage R (see 7). At the same time the relay 201 is placed under voltage thus ensuring the continuous supply of the electromagnet 9 when the relay 220(2) is opened and the contactor 106 is no longer actuated by the small carriage R which moves simultaneously with the large carriage. The finger 2 is lifted and actuates the contactor 101o, thus applying voltage to the motor 1. The large carriage moves and the contactor 107 thus no longer being actuated, is re-closed and ensures the continuous supply to the electromagnet 9 when 220(2) is re-opened. Having arrived in the vicinity of the following series of anodes, the finger 2 approaches the stopping notch 4 having the shape of a shoe. This part of the notch is such as momentarily to actuate the contactor 107c. It is re-opened and thus interrupts the supply of the electromagnet 3. The finger 2 falls back and ceases to actuate 101o, the motor stops. As soon as the finger 2 has engaged with the notch 4, the large carriage is locked. The contactor 110 is actuated (circuits (1), (2) and (3) closed—circuit (4) open) as soon as the finger 2 engages with the notch 4.

(b) Electromagnet 9 and motor 7. The relay 220(1) being closed, the closing of the contact 102o causes the application of voltage to the electromagnet 9 and the relays 207 and 208. The finger 8 being lifted, the contactor 116 is actuated, the closing of the circuit (1) giving rise to the application of voltage to the motor 7. As the small carriage moves, the contactor 106 is no longer actuated, nor are the contactors 111 (circuit (1) closed, circuit (2) open and 117c closed). After a certain course the small carriage stops, the contactor 117 and 111 being simultaneously actuated by the shoe 50. The electromagnet is no longer under voltage, the finger 8 falls back and ceases to actuate the contactor 116 (circuit (1) open, circuits (2) and (3) closed). The motor 7 stops and the reversal of the direction of its rotation is prepared by the application of voltage to the relays 206 and 218.

(c) Motor 5: As soon as the contactor 110 is actuated by the finger 2, the motor 5 is placed under voltage (the relay 205 being timed to one second) and the contact plug 6 descends into the connector 70. The operation then continues as under 1b.

(9) The operations then continue as under 2, etc.

(10) Having arrived in front of the last series of anodes, the large carriage $C_1$ actuates the contactor 105c which opens. The opening of the contactor causes the complete stopping of the apparatus, when, after having controlled the last anode, the small carriage R moves to the position "end of control" $FR_3$.

Various safety devices are thus provided: the motor 1 (large carriage) cannot be set in motion (by means of the electromagnet 3) if the contact plug 6 and the fastening tube 15 are not raised. The motor 7 (small carriage) can operate only if the tube 15 is in the high position. On the other hand, the motor 5 can be supplied only if the fingers 2 are engaged with the notches 4 ensuring the locking of the large carriage. The motors 34, 12 and 30 can be supplied only if the large carriage is locked (fingers 2 in the notches 4) and also the small carriage (finger 8 in notch 10). It has been seen that the motors 1 and 7 ensuring the displacement of the large carriage and the small carriage respectively can be put under voltage only if the fingers 2 and 8 are lifted. In order to provide this safety device, it is possible to use for example a magnetic coupling for connecting the rollers to the axles, the electromagnet being placed under voltage when the fingers 2 and 8 are lifted.

Other safety devices are also provided. They have the effect of insuring that the re-ascent of the anode cannot be interrupted unless the current has regained a normal value. On the other hand, if the current circulating through the copper bars already exceeds the control value which is made evident by a visible signal and an audible signal, the apparatus raises the anodes until the current falls to a normal value. At this instant, the apparatus stops and can be started again only by a manual operation which stops the visible and audible signals.

The device is not limited to the control operations described above. It may also, by using suitable contactors and appropriate relays, effect for example the following operations:

lift and lower all anodes a similar amount without previously placing the electrodes in contact;
control the anode $a_1$, then lower the following anodes $a_2, a_3, a_4 \ldots a_{32}$ the same amount as $a_1$; control $b_1$, then $b_2, b_3, b_4 \ldots b_{32}$ and so forth.

In the case of control operations such as described above, the device permits one to estimate the wear of the graphite anodes. It is sufficient to arrange a secure mark on the pincers, which passes before a scale during the vertical movement of the pincers, the distances of descent of the pincers during the consecutive controls giving the extent of the wear of the anodes.

It must be clearly understood that the method described above is capable of numerous modifications and can be applied to different types of horizontal electrolytic cells in which a fluid or liquid cathode, for example, mercury, is used and in which the anode is movable and adjustable as to its vertical position relative to the cathode.

The method of the invention provides for regulating, during operation, the spacing of the electrodes and a method for decomposing a substance decomposable by an electrolytic current in an electrolytic cell continuously. The electrolytic cell, not shown, is of the known liquid cathode type in which the cathode is a mercury cathode and the anodes are made of graphite as heretofore described. The method of adjusting the electrode clearance and settings provides for use in electrolytically decomposing different materials, for example, aqueous solutions of alkali metal chlorides or brine, into chlorine, Na and other components.

The heretofore described positioning of the anodes relative to the cathode by advancing them in the direction of the cathode takes place by advancement of the anodes through the substance. The aqueous solution, being decomposed electrolytically and in the direction to approach the mercury cathode until the electrolytic current of the cell undergoes a rapid increase corresponding to an indication of an incipient short circuit between the individual anodes and the cathode. During the advancing of the individual anodes toward the cathode the rapid increase of electrolytic current is detected and at this point the anode, being advanced toward the cathode, is displaced in an opposite direction by the mechanism heretofore described to a vertical distance spaced from the mercury cathode substantially corresponding to the optimum yield of the cell and without completely short circuiting the anode and the cathode.

Figure 7:
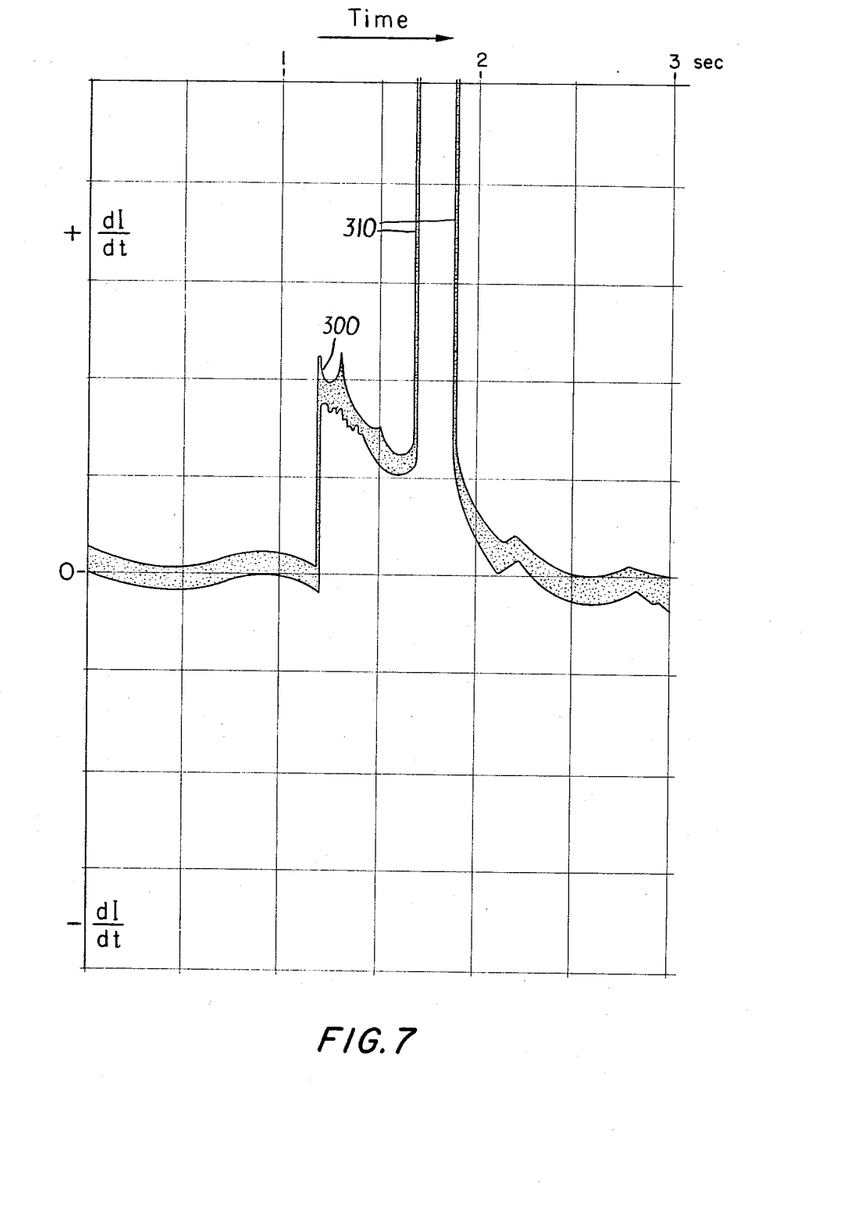
FIG. 7 is a graph of the rate of change of cell current relative to time for illustrating a principle of method according to the invention.

The drawing illustrates in FIG. 7 the determination of the point at which advancement of an anode toward the cathode ceases and retraction or displacement in the opposite direction takes place. In the graph the ordinate is the derivative or derived function $dI/dt$ of the current $I$, not the current itself, with respect to time $t$ shown in the abscissa as an anode is lowered at a constant velocity. It can be seen, therefore, that the abscissa represents both time and the anode-cathode distance. The lowering of a given anode starts at the time designated zero (0) at which time the anode is in position before adjustment takes place.

In the graph or diagram, if advancement of an anode toward the cathode continues, a complete short circuit will take place, for example, at a time period of three seconds. A study of the diagram, however, illustrates two discontinuities or peaks in the positive region of the $dI/dt$ function. A first sudden current rapid increase takes place in the region designated 300 while the anode is lowered. This rapid increase is indicative of an incipient short circuit. A second rapid increase 310 is illustrative of a complete anode-cathode short circuit. The first increase takes place at a time of about 1.2 seconds after advancement of the anode toward the cathode starts. It should be understood that this first rapid increase is prior in time to the second increase that would take place if advancement of the anode was continued in the direction of the cathode. As shown in the graph the first increase takes place over half a second before a complete short circuit ensues.

Thus, the first rapid increase of the cell current takes place in the early stages of a short circuit and it is not intended in the method according to the invention to establish a complete or full short circuit between the two electrodes. The reference point or mark 300, constituting the first rapid current increase, takes place at a point of advancement of an anode toward the cathode until the electrolytic current reaches a given value as a function of the voltage existing in the cell as heretofore set forth. This value of the current is precisely that point where the first rapid rise in the $dI/dt$ function occurs. From that moment on the current is no longer directly a function of the voltage existing in the cell.

As can be seen in FIG. 7 the first derivative of the current remains constant for an interval in the order of 1.2 seconds from the origin, however, this does not mean that the current itself is constant. On the contrary, the current increases regularly, i.e. the function $I=f(t)$ is a straight line function. At the time interval 1.2 seconds, however, the sudden increase in current takes place and the value of the current is no longer a function of the voltage at the poles or faces of the electrodes.

In order to detect the reference mark 300 at which advancement of an anode in the direction of the cathode ceases and a reverse movement thereof takes place, the anode is advanced downwardly toward the cathode through the substance being decomposed electrolytically until local contact of the anode takes place in the mercury cathode. That is to say, in order to reach the reference mark the lower surface of the anode, being advanced toward the cathode, must be brought below the average level of the mercury forming the cathode of the cell. However, the local contact initially does not establish a direct contact between the electrodes resulting in a full and complete short circuit. The local contact is between portions of the anode and cathode. While what takes place is not exactly known, the preliminary rapid current rise establishing the reference mark or point 300 as before described is believed to result in the incipient or preliminary stages of a complete short circuit in that if the graphite anode is pressed below the average level of the mercury, a film of aqueous solution, brine, for example, and a pocket of chlorine are entrapped under the anode and the mercury is repelled so that a direct contact between the electrodes is avoided. If lowering of the anode into the mercury were to continue to a direct contact, a short circuit 310, between the cathodes would necessarily take place and this direct contact may well occur before the anode touches the metallic base or sole of the cell. It is believed that the entrapped material has sufficient gaps as the chlorine gas escapes to bring about the rapid current rise which provides the reference mark 300.

The method of cell operation of the invention requires that the graphite anode is always subjected to an electrolysis voltage during adjustment so that electrolysis goes on during the electrode adjustment even after the anode has been immersed into the mercury. The continued operation is necessary since the electrolytic current detects, through its sudden rise, a definite reference point 300 from which the anode must be reversed in direction of movement.

Those skilled in the art will thus recognize that the present invention provides an improved method for cell operation and electrode adjustment and an improved method for decomposing a substance decomposable by an electrolytic current in an electrolytic cell. The methods of adjustment and cell operation of the invention result in continuous operation of the electrolytic cell avoiding the necessity of cessation of cell operation. Those skilled in the art know that in order to shut down an electrolytic cell and to start it again later a highly specialized team of highly specialized operators is required and both operations, shutdown and starting up, always inherently carry a risk in spite of the precautions taken.

Closing down or shutting up a cell involves a loss of production and the immediate decomposition of the amalgam (Na-Hg) of the cathode under the action of chlorine and chlorinated brine. The mercury thus deprived of amalgam loses its wettability and a large area of the metallic sole of the cell, not shown, is, therefore, exposed to the corrosive action of chlorine. The resulting iron chloride will contaminate the brine. Furthermore, as the mercury bring about the formation of localized cushions of mercury the the uttermost ends of the call. Islands of "mercury butter" (dirthy malgam) float inevitably on the surface of the liquid cathode; the thickness of these islands depends on the cleanliness of the sole, on the date of flow and the viscosity of the mercury. As all these factors cannot be assessed accurately, in the cose of a "to the sole" adjustment, a wide margin of safety must be provided that increases the elctreolysis voltage increases. If the "sole A "to the sole" adjustment—i.e. making the graphite anode touch the metallic sole of the cell—is known in the art but such an adjustment is never more than an approximate adjustment since it does not allow for the thickness of the pool of mercury. The thickness varies appreciably from one point to another. Furthermore, barriers of mercury bring about the formation of localized cushions of mercury at the uttermost ends of the cell. Islands of "mercury butter" (dirty malgam) float inevitably on the surface of the liquid cathode; the thickness of these islands depends on the cleanliness of the sole, on the rate of flow and the viscosity of the mercury. As all these factors cannot be assessed accurately, in the case of a "to the sole" adjustment, a wide margin of safety must be provided that increases as the electrolysis voltage increases. If the "sole adjustment" is to be carried out with the anodes being disconnected the cell has to be shut down with all the drawbacks outlined above. The present invention avoids these drawbacks.

If a cell is to be cut off by means of a single disconnecting switch the price of this would be prohibitive bearing in mind the amperage applied. The manipulation of several disconnecting switches, on the other hand, automatically increases the overall time required for operating the adjustment. Moreover, these switches quickly deteriote.

The process of electrode adjustment disclosed in the present invention avoids all these drawbacks. It is extremely short and it provides a distance between electrodes which allows both for the thickness of the mercury and most of all also for the operating condition (amperage) of the cell since the adjustment is carried out under electrolysis voltage without ever interrupting the current.

What we claim and desire to secure by Letter Patent is:

1. A method for decomposing a substance decomposable by an electric current in an electrolytic cell having a liquid cathode and a movable anode which comprises, providing a substance decomposable by electric current in an electrolytic cell, disposing said substance in an electrolytic cell having in operation a liquid cathode and a movable anode in spaced relationship, applying a voltage to said cathode and said anode to develop an electrolytic current flow through said substance, at least periodically adjusting the distance between said anode and liquid cathode without interruption of electrolysis in said electrolytic cell by advancing said anode through said substance being decomposed electrolytically and in a direction to approach the cathode, whereby the electrolytic current of said cell increases at a rate proportionate to the speed of said advancing, until the electrolytic current of said cell undergoes a rapid increase disproportionate to the speed of said advancing and corresponding to an indication of an incipient short circuit between said anode and said cathode, during said advancing detecting said rapid increase of said electrolytic current, and then displacing said anode in an opposite direction to a vertical distance spaced from said mercury cathode substantially corresponding to the optimum yield of said cell and without completely short circuiting said anode and cathode.

2. A method for operating an electrolytic cell for electrolysis of an aqueous solution decomposable into a gas and other components by an electric current and having an electrically conductive liquid cathode and a movable anode spaceable relative to the cathode and movable toward and away from said cathode which comprises, advancing during operation of the cell said anode through said aqueous solution and said gas in a direction to approach the cathode until the electrolytic current undergoes a rapid increase corresponding to an indication of an incipient short circuit between said anode and said cathode, during said advancing of said anode detecting said rapid increase of said electrolytic current, and then displacing said anode in an opposite direction to a distance spaced from said mercury cathode substantially corresponding to the optimum yield of said cell and without completely short circuiting said anode and cathode.

3. A method for regulating during operation the distance between a graphite anode and a mercury cathode in an electrolytic cell for electrolysis of aqueous solutions which comprises, advancing during operation of the cell said anode in a direction to approach the mercury cathode until the electrolytic current undergoes a rapid increase, during said advancing of said anode detecting said rapid increase of said electrolytic current, and then displacing said anode in an opposite direction to a distance above said mercury cathode substantially corresponding to the optimum yield of the cell and without completely short circuiting said anode and cathode.

4. A method according to claim 3, in which said cell contains an aqueous solution during operation and in which said anode is advanced through said aqueous solution until a portion thereof makes contact with said mercury cathode before displacing said anode in an opposite direction, said rapid increase of the electrolytic current occurring when a portion of said anode makes contact with said mercury cathode.

5. A method according to claim 3, in which said aqueous solution is an aqueous solution of an alkali metal halide.

6. A method according to claim 5, in which said alkali metal halide is sodium chloride.

7. A method for regulating during operation the distance between a plurality of graphite anodes and a mercury cathode in an electrolytic cell for the electrolysis of aqueous solutions, which comprises consecutively advancing said anodes individually in a direction toward said mercury cathode until a portion of the individual anode makes contact with said mercury cathode and the electrolytic current undergoes a rapid increase, during said advancing of the anodes sensing the electrolytic current of said cell, and then without reaching the bottom of said cell retracting the individual anodes in the opposite direction away from said mercury cathode to a distance above said mercury cathode substantially corresponding to the optimum yield of the cell.

References Cited

UNITED STATES PATENTS

| | | | |
|---|---|---|---|
| 2,328,665 | 9/1943 | Munson | 204—250 |
| 2,731,412 | 1/1956 | Ferrand | 204—223 |
| 3,275,538 | 9/1966 | Haupt et al. | 204—143 |

HOWARD S. WILLIAMS, *Primary Examiner.*

JOHN H. MACK, *Examiner.*

H. M. FLOURNOY, *Assistant Examiner.*